United States Patent [19]
Hokanson

[11] Patent Number: 5,083,055
[45] Date of Patent: Jan. 21, 1992

[54] NOTCHED CARBON BRUSH FOR ROTATING ELECTRIC MACHINES

[75] Inventor: Paul R. Hokanson, Girard, Pa.
[73] Assignee: General Electric Company, Erie, Pa.
[21] Appl. No.: 628,801
[22] Filed: Dec. 17, 1990
[51] Int. Cl.[5] .................................... H02K 13/00
[52] U.S. Cl. ........................... 310/248; 310/220; 310/233; 310/239; 310/251
[58] Field of Search ............ 310/251, 248, 249, 252, 310/253, 239, 247, 233, 236, 237, 220, 221, 222, 261

[56] References Cited

U.S. PATENT DOCUMENTS

| | | | |
|---|---|---|---|
| 752,634 | 2/1904 | Young | 310/236 |
| 1,757,611 | 5/1930 | Binney | 310/248 |
| 3,171,050 | 2/1965 | Gordon | 310/239 |
| 3,484,686 | 12/1969 | Wade | 310/248 U X |
| 3,980,914 | 9/1976 | Cunningham | 310/251 |
| 4,739,209 | 4/1988 | Sherman | 310/249 |

FOREIGN PATENT DOCUMENTS

| | | | |
|---|---|---|---|
| 0085658 | 4/1987 | Japan | 310/253 |
| 0311848 | 12/1989 | Japan | 310/251 |
| 0813649 | 5/1959 | United Kingdom | 310/248 |

*Primary Examiner*—R. Skudy
*Attorney, Agent, or Firm*—R. Thomas Payne

[57] ABSTRACT

The trailing edge of a carbon brush for commutating electric machines has a notch flanked by an ear on either side. The brush can include one or more wafers. The angular thickness of the trailing brush wafer at the notch is such that the brush does not touch more than n commutator contacts at a time. However, the brush wafer is thick enough at the ears to touch n+1 commutator contacts at a time. The relatively high resistance of the ears improves commutation.

14 Claims, 2 Drawing Sheets

NOTCHED CARBON BRUSH FOR ROTATING ELECTRIC MACHINES

This invention relates to carbon brushes for commutating electric machines, and more particularly, to notched carbon brushes which prevent or reduce sparking at the trailing edge of the brush.

BACKGROUND OF THE INVENTION

Brushes used in commutating electric machines such as motors and generators tend to create sparks which wear down the brushes and commutator contacts. Such sparks are undesirable because they reduce both the life of the brushes and commutator, and the performance of the machine.

U.S. Pat. No. 3,980,914 describes a solid brush for electric machines which has carbon fibers attached to the leading and trailing edges of the brush, to reduce sparking. However, that brush is several times more expensive than ordinary solid brushes. Thus, there is a need for brushes for commutating electric machines which reduce sparking and also are relatively inexpensive.

Accordingly, one object of this invention is to provide new and improved carbon brushes for commutating electric machines.

Another object is to provide new and improved carbon brushes which prevent or reduce sparking.

Still another object is to provide new and improved carbon brushes which prevent or reduce sparking and are relatively inexpensive.

SUMMARY OF THE INVENTION

In keeping with one aspect of my invention, a split carbon brush for commutating electric machines includes at least one, and preferably two or more adjacent wafers, each wafer having a trailing edge and a leading edge. The brush is slidably secured to the machine in the channel of a brush holder, and a spring presses the surfaces of the brush wafers against contacts in a commutator as the commutator rotates with the rotor of the machine. The commutator contacts are separated from each other by insulators. As the commutator rotates, the commutator contacts pass beneath each brush wafer in succession. The first wafer the contacts pass beneath is the leading wafer, and the last wafer is the trailing wafer. The trailing edge of the last wafer is also the trailing edge of the brush.

The trailing edge of the brush has a notch flanked by an ear on either side. The ears support the brush in the brush holder channel, and create relatively high resistance as the contacts break electrical contact with the trailing edge of the brush. The thickness of the trailing wafer notched portion of the is such that the notched portion does not touch more than n contacts at a time. The thickness of the trailing wafer at the ears is such that the wafer can touch n+1 contacts when the trailing edge breaks electrical contact with the contact. For example, if n=2, then the trailing wafer would touch not more than two commutator contacts at a time, except at the ears, where it would touch three commutator contacts at the time the trailing edge breaks electrical contact with each commutator contact. In this example, circulating currents across the brush wafer surface between the three commutator contacts are forced to travel through the high resistance ears, aiding commutation.

BRIEF DESCRIPTION OF THE DRAWINGS

The above-mentioned and other features of an embodiment of this invention will become more apparent, and will be best understood by reference to the following description, taken in conjunction with the accompanying drawings, in which.

DETAILED DESCRIPTION

Figure 1:
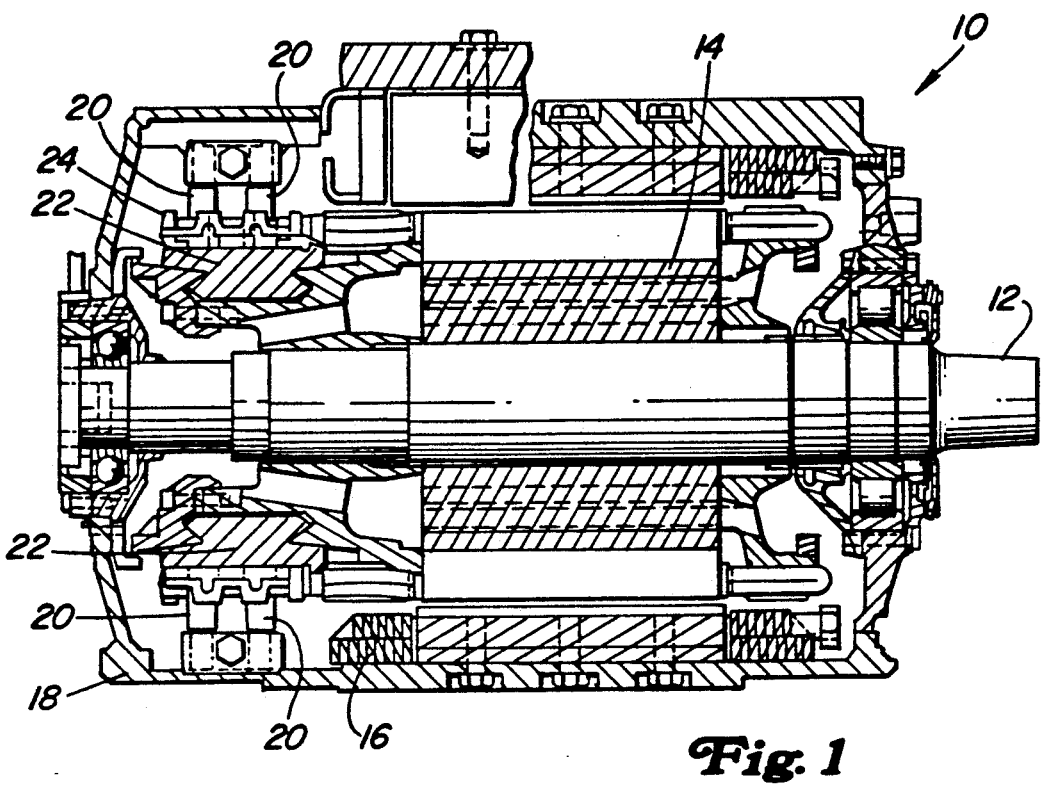
FIG. 1 is a cross-sectional view of a commutating electric machine having carbon brushes made in accordance with the principles of this invention.
Figure 2:
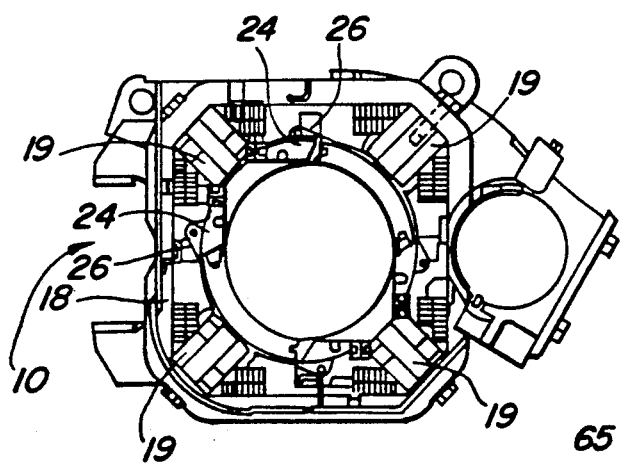
FIG. 2 is a cross-sectional end view of the apparatus of FIG. 1, with the rotor and brushes removed.

As seen in FIGS. 1 and 2, an electric commutating machine 10 includes a rotor 12 having a plurality of coils 14, a stator 16 secured in a housing 18, and a plurality of commutating poles 19. The machine 10 could be an electric motor, an electric generator or the like, and could be designed to rotate the rotor 12 in only one direction, or in both directions.

The illustrated machine 10 also includes a plurality of two-wafer brushes 20 electrically connected to a commutator 22. The brushes 20 are operatively positioned in a brush holder 24 and are used against the commutator 22 by a suitable spring means 26.

Figure 3:
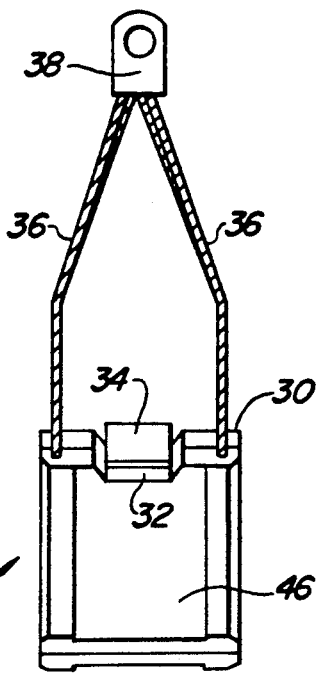
FIG. 3 is a front view of a brush used in the machine of FIG. 1.
Figure 4:
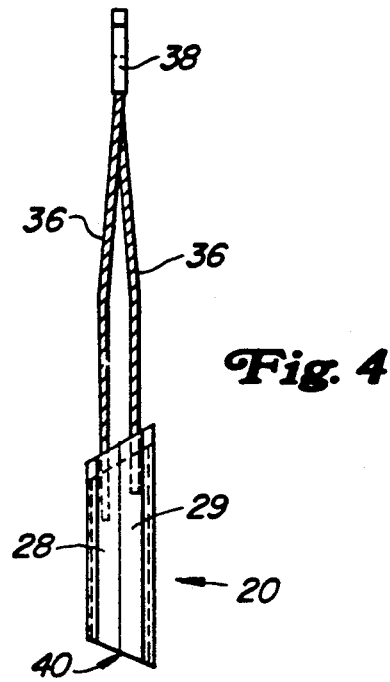
FIG. 4 is a side view of the brush of FIG. 3.
Figure 5:
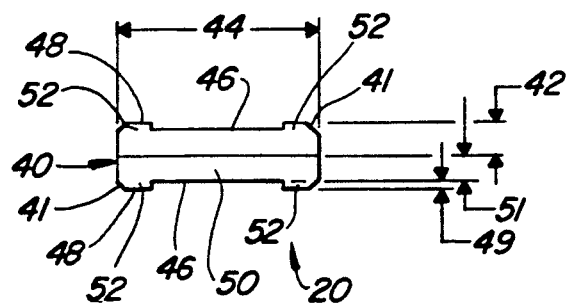
FIG. 5 is an end view of the brush of FIG. 3.

As shown in greater detail in FIGS. 3, 4 and 5, each brush 20 includes two solid wafers 28, 29 made of carbon or the like. A single wafer two, or more than two wafers could be used, if preferred. While the brushes 20 shown are reaction brushes, radial brushes could be used, as well.

The wafers 28, 29 are preferably flexibly secured to each other at one end 30 by a flexible material 32 and a hard cover 34. The wafers 28, 29 include four electrical wires 36 which are suferably secured to a terminal 38. The terminal 38 is connected to a source of electrical current (not shown). The inside edges 31, 33 of the wafers 28, 29 are in electrical contact, but relatively high resistance at the junction of the wafers 28, 29 reduces undesired circulating currents across a contact face 40 of the brush 20.

The surface 40 is in electrical contact with the commutator 22 during operation. The surface 40 of each wafer 28, 29 has a total angular thickness 42 and a total width 44 (FIG. 5). The wafers 28, 29 also have a notch 46 which extends vertically along an outer face 48 of the wafers 28, 29. A chamfer 41 may be provided in each outside corner of the brush 20, if desired.

The notch 46 has a depth 49, and the wafer 28 has a reduced portion 50 in the notch 46, which has a reduced thickness or distance 51. The notch 46 may extend across between about 66% and 78% of the total wafer width 44, not including the chamfers 41, or any width which leaves a suitable ear 52 on each side of the notch 46. The ears 52 may be any suitable size which provides relatively high resistance and a relatively high contact voltage drop during operation by virtue of the reduced contact area of the ears 52 with the commutator 22.

Figure 6:
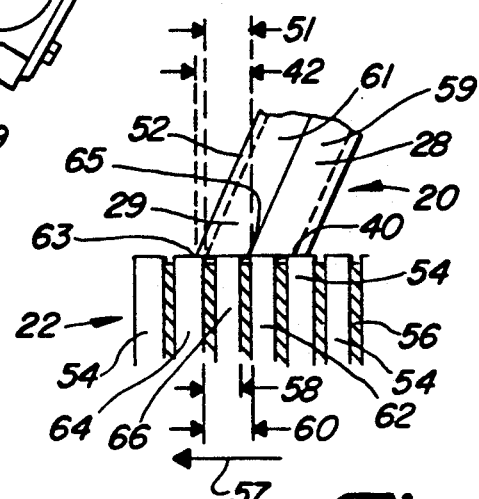
FIG. 6 is a transverse sectional diagram of a portion of a commutator and the brush of FIG. 3.

A portion of the commutator 22 is shown in FIG. 6, with the surface 40 and the brush 20 in electrical contact with the commutator 22. The commutator 22 includes a plurality of spaced contacts 54 which are separated from each other by insulators 56.

While the portion of the commutator 22 shown in FIG. 6 appears flat for illustrative purposes, the commutator 22 is actually round, and rotates in a direction 57. The brush 20 includes a leading wafer 59 and a trailing wafer 61 having a trailing edge 63 and a leading edge 65. If the commutator 22 rotated in the direction opposite to the direction indicated at 57, the wafer 59 would be the trailing wafer, and the wafer 61 would be the leading wafer. In FIG. 6, a notch 46 is provided in both wafers 59 and 61, to accommodate reversible machines and to improve performance. If only one wafer were used and both the trailing edge and the leading edge had a notch, the distance 51 would be measured from an effective leading edge which might be determined experimentally by finding the distance 51 which produced the best commutation, as will be described.

The outer circumference of the commutator 22 divided by the number of contacts 54 is known as the contact pitch, designated by reference numeral 58 in FIG. 6. The sum of one pitch 58 plus the thickness of the adjacent insulator 56 is identified in FIG. 6 as a distance 60, which represents the total distance between the most closely adjacent edges of a leading contact 62 and a trailing contact 64. The contacts 62, 64 are separated by a center contact 66. The contacts 62, 64 and 66 represent any set of three adjacent contacts in the relative positions shown in FIG. 6.

The total angular thickness 42 is preferably slightly greater than the distance 60, so that the trailing wafer 61 is in electrical contact with one more than two contacts at a time as each contact 54 breaks electrical contact with the trailing edge 63. However, the distance 51 is preferably less than the distance 60, so that the reduced portion 50 of the wafer 61 is never in contact with more than two contacts 54 at one time. The reduced thickness 51 could be connected to a different number of contacts at a time, provided that if the reduced portion 50 touches n contacts simultaneously, the total angular thickness 42 touches n+1 contacts simultaneously at times.

Commutation can be evaluated by measuring a "black band" of operating parameters in which sparking does not occur. The black band is measured by operating a commutating electric machine at various load levels, and varying the flux created by the commutating poles 19, to affect commutation until visible sparking occurs. FIGS. (a), (b) show an example of the results obtained by such "black band" testing using a brush without notches (FIG. 7(a)) and a brush made in accordance with the brush of FIG. 3 (FIG. 7(b)) in a generator.

Figure 7A:
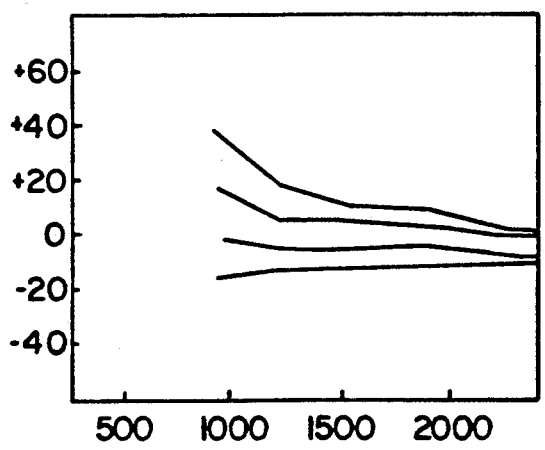
FIG. 7(a) is a graph showing test results using a brush which does not use the brush of FIG. 3.

The results shown in FIGS. 7(a), (b) are generally self-explanatory to persons familiar with black-band testing. The horizontal axis shows the rotor speed in revolutions per minute (RPM) of the generator, and the vertical axis measures the flux change generated by the commutator coils. Thus, using brushes which did not have of this notches of this sparking occurred at about 1,500 RPM when the flux was above or below about −12 to +10, and −5 to +5 in the two different polarities of the brushes, respectively. Using the notched brushes of FIGS. 3–5 about 1,500 RPM, sparking did not occur until the flux was above or below about −28 to +28, and −20 to +25 in the two different polarities of the brush, respectively. The "black bands" of the two different polarities are indicated by dashed and solid lines, respectively. This broadened black band represents a significant improvement in performance.

Figure 7B:
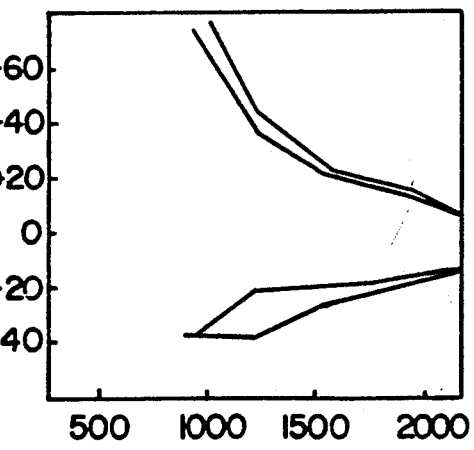
FIG. 7(b) is a graph showing test results using the brush of FIG. 3, made from the same brush material used for the brush of FIG. 7(a).

The brushes used to obtain the test results shown in FIG. 7(b) had a notch on each side, as in FIG. 5, because the machine operated in both rotational directions. In machines which operate in only one direction of rotation, it is only necessary to notch the trailing wafer. However, if only the trailing wafer is notched, the center of the black band would shift from the center line in FIG. 7(b).

The many advantages of this invention are now apparent. Sparking is reduced or eliminated through a broader range of operating parameters, at a relatively low cost. Brush and commutator life is extended, and machine performance is improved.

While the principles of the invention have been described above in connection with specific apparatus and applications, it is to be understood that this description is made by way of example and not as a limitation on the scope of the invention.

I claim:

1. A carbon brush for use in an electric machine having a rotor and a commutator operably connected to the rotor, the commutator having a plurality of circumferential contacts each separated by an insulator having a thickness, the contacts further having a pitch defined as a circumference of the commutator divided by the number of contacts in the commutator, the machine further having a brush holder secured to the machine, a channel in the holder for slidably positioning the brush relative to the commutator, and a spring for urging the brush against the commutator, the brush including at least one wafer, having a trailing wafer comprising:
   a surface which is pressed against the commutator contacts by the spring as the rotor and commutator rotate,
   a leading edge of the surface being in electrical contact with succeeding contacts as the commutator rotates,
   a trailing edge of the surface being in electrical contact with succeeding contacts as the commutator rotates,
   the surface having a first angular thickness between the trailing edge and the leading edge, and a reduced portion having a second-angular thickness between the trailing edge and the leading edge, the second thickness being less than the first thickness,
   the reduced portion being formed by a notch in the trailing edge,
   the first angular thickness being greater than the sum of a selected number of pitches plus a thickness of one insulator, and the second angular thickness being less than the sum of a selected number of pitches plus the thickness of one insulator.

2. The brush of claim 1 wherein the selected number of pitches is one.

3. The brush of claim 1 wherein the notch extends between about 66% and 78% of the total width of the surface.

4. The brush of claim 3 wherein the notch is in about a center of the trailing edge and the surface includes an ear on each side of the notch, the ears having a reduced surface area and relatively high resistance.

5. An electric machine comprising:
a rotor;
a commutator operatively connected to the rotor and having a plurality of radially spaced contacts separated by insulating means, and a pitch defined as a circumference of the commutator divided by a number of the contacts in the commutator;
a brush having at least one wafer for making electrical connection with the contacts as the commutator rotates, the brush including a trailing wafer which is last to contact the contacts; and
spring means for positioning the brush against the commutator;
the trailing wafer having a surface which is urged into contact with the contacts by the spring means as the rotor and the commutator rotate, a leading edge in electrical contact with the contacts as the commutator rotates, and a trailing edge in electrical contact with the commutator contacts as the commutator rotates;
the trailing wafer surface having a first angular thickness between the trailing edge and the leading edge, and a reduced portion having a second angular thickness between the trailing edge and the leading edge, the second angular thickness being less than the first angular thickness;
the reduced portion being formed by a notch in the trailing edge;
the first angular thickness being greater than the sum of a selected number of pitches plus a thickness of one insulator, and the second angular thickness being less than the sum of the selected number of pitches plus the thickness of one insulator.

6. The machine of claim 5 wherein the selected number of pitches is one.

7. The machine of claim 5 wherein the brush comprises two wafers, the trailing and a leading wafer, the leading wafer comprising a leading edge and a reduced portion in the leading edge, whereby if the rotational direction of said machine is reversed, the leading edge of the leading wafer functions as the trailing edge of the brush.

8. The machine of claim 5 wherein the selected number of pitches is at least one.

9. An electric motor comprising:
a rotor;
commutator means having a plurality of contacts separated by insulating means, operatively connected to the rotor, a circumference of the commutator means divided by a number of contacts equals a pitch;
brush means having a surface, a leading edge and a trailing edge, operatively positioned relative to the commutator means, for establishing electrical contact with the commutator means;
notch means, operatively formed in the brush means, for reducing the surface of the brush in electrical contact with commutator means so that the brush means surface at the notch means in electrical contact with the commutator means is less that a selected number of pitches plus one insulating means.
wherein the notch means comprises about 66% to about 78% of a total width of the surface.

10. The motor of claim 9 wherein the thickness of the remaining portion of the surface of the brush means is greater than a selected number of pitches plus one insulator means.

11. The motor of claim 9 wherein the brush means comprises at least one wafer means.

12. The motor of claim 9 wherein the brush means comprises at least two wafer means.

13. The motor of claim 9 further comprising:
ear means, operatively formed on each side of the notch means.

14. The motor of claim 13 wherein in the notch means is approximately centered between the ear means.

* * * * *